United States Patent
Matsuo

[15] 3,690,647
[45] Sept. 12, 1972

[54] SHEET FEEDING APPARATUS
[72] Inventor: Masaharu Matsuo, No. 17-13, 3-chome, Higashikomagata, Sumida-ku, Tokyo, Japan
[22] Filed: Oct. 22, 1970
[21] Appl. No.: 83,088

[30] Foreign Application Priority Data

March 23, 1970 Japan ..................... 45/23580

[52] U.S. Cl. .................................. 271/49, 271/52
[51] Int. Cl. ......................................... B65h 9/16
[58] Field of Search .271/52, 49, 51; 193/35 R, 35 A, 193/35 B, 35 C, 37

[56] References Cited

UNITED STATES PATENTS

| | | | |
|---|---|---|---|
| 1,385,654 | 7/1921 | Bacon | 271/52 |
| 3,550,741 | 12/1970 | Sherman | 271/52 X |
| 2,600,747 | 6/1952 | Faust | 193/35 X |
| 3,334,892 | 8/1967 | Janecek et al. | 271/51 |
| 3,031,895 | 5/1962 | Kindig | 193/37 X |
| 2,994,899 | 8/1961 | Moilanen | 29/122 X |

*Primary Examiner*—Evon C. Blunk
*Assistant Examiner*—Bruce H. Stoner, Jr.
*Attorney*—Kelman & Berman

[57] ABSTRACT

Cardboard sheets and the like are fed to a rotary die cutter by a conveyor having a multiplicity of idling guide rollers tangential to a common horizontal plane and rotating in respective parallel planes perpendicular to the common plane and approaching the face of a stationary lateral guide at a small acute angle in the direction of sheet movement. Each sheet is pushed over the guide rollers by a dog on an endless conveyor chain and laterally deflected by the guide rollers into engagement with the stationary guide.

4 Claims, 4 Drawing Figures

SHEET FEEDING APPARATUS

This invention relates to sheet feeding apparatus, and particularly to apparatus for feeding sheet material, such as cardboard, to a processing machine in a precisely defined path for alignment with the machine.

The problem to be solved, and my invention will be described hereinafter with reference to a rotary die cutter, but it will be understood that the invention is not limited to this specific application.

When sheets of cardboard are fed to a die cutting machine, precise alignment of the sheet with the machine, and particularly with its cutters, is of obvious importance. Yet, known simple feeding devices produce a significant amount of scrap because of misalignment between the sheet as it enters the machine and the cutting tools, and the percentage ratio of scrap to useful product increases as the weight of the sheet decreases. Sheet feeding devices capable of precise alignment in all cases are rather complex.

The primary object of this invention is the provision of a simple sheet feeding device which reliably aligns each sheet, regardless of its weight, with the operating elements of an associated processing machine.

With this object and others in view, the sheet feeding apparatus of this invention provides a stationary guide whose face laterally bounds the path of sheet movement and is parallel to the direction of sheet movement in the path. A multiplicity of guide rollers is mounted for rotation in respective planes obliquely inclined relative to the face of the guide. The outer circumferences of the rollers are tangential to a common plane of sheet movement which is transverse to the guide face and to the planes of roller rotation, and downwardly bounds the sheet path. A conveyor sequentially moves the sheets in the aforementioned direction and in the common plane while each sheet is in rolling contact with the roller circumferences.

The planes of roller rotation are practically parallel and approach the face of the guide member at an angle smaller than 45° in the direction of sheet movement. Groups of the rollers are mounted on common shafts and are freely rotatable on the shafts, the shafts being supported on a frame which also supports the guide member.

Other features, additional objects, and many of the attendant advantages of this invention will readily become apparent from the following detailed description of a preferred embodiment when considered in connection with the appended drawings in which.

Figure 1:
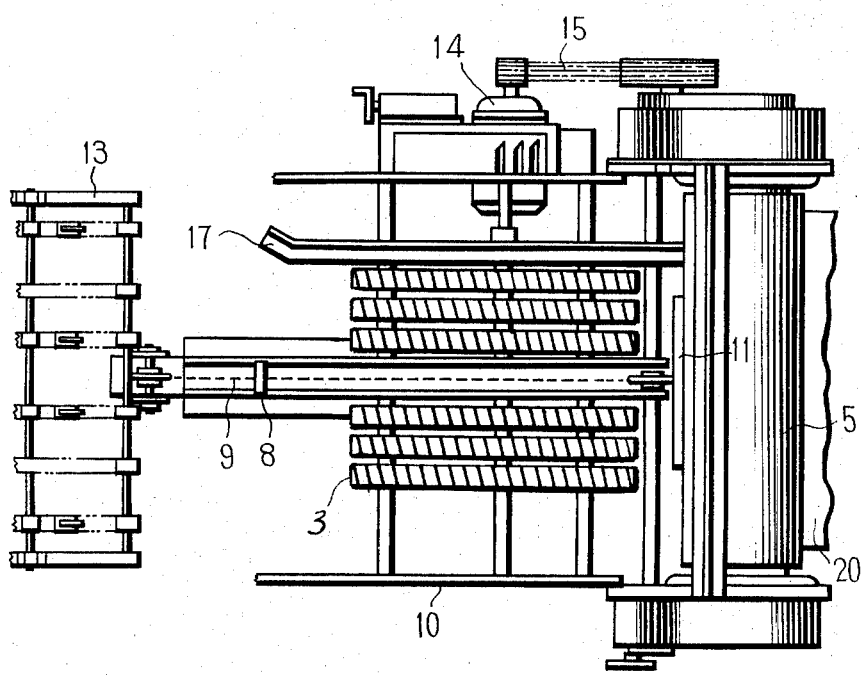
FIG. 1 shows a die cutting machine equipped with a sheet feeding apparatus of the invention in top plan view, a portion of the feeding apparatus being omitted to show otherwise concealed elements.

The illustrated machinery has a frame 10 common to the sheet feeding apparatus and to the rotary die cutter to which the sheets are being fed. The die cutter, not directly relevant to this invention has an upper cylinder 6, omitted from FIG. 1, and a lower cylinder 5 respectively carrying male and female dies, not shown. The upper cylinder turns about a fixed axis, while the lower cylinder is journaled in eccentrics and may be shifted toward and away from the upper cylinder by a hydraulically operated mechanism 12, movement of the cylinder 5 toward the cylinder 6 and rotation of the cylinders being triggered by a limit switch 11 which senses a sheet entering the gap between the cylinders and energizes a solenoid valve in the non-illustrated hydraulic circuit of the mechanism 12 and the cylinder drive, not shown.

Sheets to be cut between the cylinders 5, 6 are supplied from a non-illustrated stack by a conveyor 13 having several transversely spaced conveyor belts.

This invention is more specifically concerned with the sheet feeding mechanism which receives individual sheets of cardboard or the like from the conveyor 13 and delivers them to the limit switch 11 and the cylinders 5, 6. The sheet feeding mechanism has an idler sprocket 4 mounted on the frame 10 below the illustrated end of the conveyor 13 and a sprocket 7 closely adjacent the limit switch 11. A motor 14 mounted on the frame 10 drives the sprocket 7 by means of a transmission including a belt 15. An endless conveyor chain 9 is trained over the sprockets 4, 7 and a tensioning pulley 16, and is provided with a dog 8.

Figure 3:
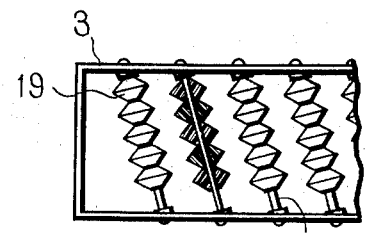
FIG. 3 shows a portion of the apparatus of FIG. 1 on a larger scale, and partly in plan section.
Figure 4:
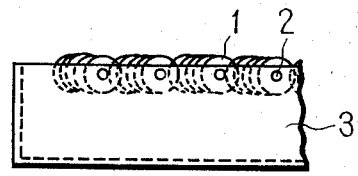
FIG. 4 illustrates the device of FIG. 3 in side elevation.

A guide or fence 17 having a vertical face 18 is adjustable on the frame 10 transversely of the horizontal upper strand of the chain 9, toward and away from six long and narrow boxes 3 arranged symmetrically on either side of the horizontal chain strand. One end of one box 3 and associated elements are seen in more detail in FIGS. 3 and 4.

Each box 3 supports a set of obliquely transverse shafts 2 offset in the direction of normal sheet movement which is longitudinally of the box. A group of five nylon guide rollers 1, omitted from FIG. 1, is freely rotatable on each shaft. All rollers 1 are identical in shape and dimensions. They are generally circular in cross section and have two coaxial frustoconical faces which flare from a narrow base contiguously adjacent the narrow base of another roller toward a common base at which they meet at an approximately right angle, thereby forming a radially outermost circular ridge 19 of angular cross section at the circumference of each roller.

Figure 2:
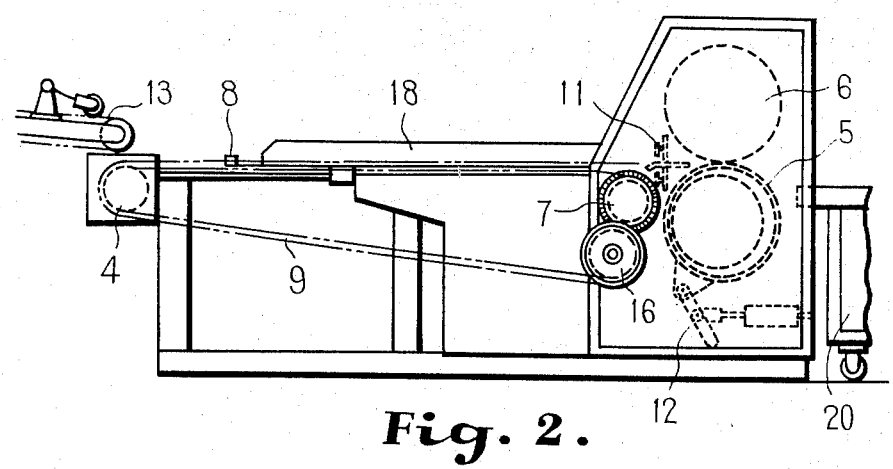
FIG. 2 shows the apparatus of FIG. 1 in side elevation.

In the installed condition of the boxes 3 on the frame 10, as shown in FIG. 2, all shafts 2 are located in a common horizontal plane, and the circular ridges 19 of the several rollers 1 are therefore tangential to a common plane in which the non-illustrated sheets travel, the plane downwardly bounding the path of the sheets which is laterally bounded by the face 18 of the guide 17.

The inclination of the shafts 2 is such that the ridges 19 rotate in respective parallel planes perpendicular to the horizontal plane of sheet travel and approaching the face 18 in the direction of sheet travel at an acute angle of less than 45°, and approximately 15° in the specific embodiment shown.

During operation of the illustrated apparatus, the chain 9 is driven continuously by the motor 14, and the dog 8, which projects upwardly beyond the plane of sheet travel, engages a sheets supplied by the conveyor 13 and moves it toward the die cutting machine, the cylinders 5, 6 being spaced from each other at this stage. When the limit switch 11 is closed, the hydraulic mechanism 12 lifts the cylinder 5 to engage the front edge of the sheet, and the non-illustrated main drive of the machine is actuated for one revolution of the cylinders, or for as many revolutions as may be needed to produce the desired result, whereupon the machine stops, and the cylinders 5, 6 are separated by the mechanism 12 for the next operating cycle. The cut sheet is discharged to a wheeled receiving table 20 for further processing or storage.

While the sheet travels from the conveyor 13 toward the limit switch 11, it rests on the ridges 19 of the rollers 1. Because the friction between the plastic rollers 1 and the shafts 2 is minimal, the rollers are turned by rolling contact with the moving sheet and exert transverse forces on the sheet, guiding the sheet into abutting engagement of its left longitudinal edge, as viewed in FIG. 1, in the direction of sheet travel, with the face 18 of the guide 17 and into the desired position of alignment with the cylinders 5, 6. Because of the relatively sharp edge of the ridges 19, even a light sheet is not buckled by the combined transverse forces exerted on the sheet by the roller 1 and the guide face 18.

An actual embodiment of the invention has been operated successfully with sheets as thin as 0.2 – 0.3 mm, and so limp as not to retain their shapes against gravity.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A sheet feeding apparatus for feeding sheet material in a precisely defined path toward a processing machine comprising, in combination:
   a. a frame;
   b. a stationary guide member mounted on said frame and having a face laterally bounding said path and parallel to the direction of sheet movement in said path;
   c. a plurality of shafts mounted on said frame and elongated obliquely to said direction, said shafts being offset from each other in said direction and substantially parallel to each other;
   d. a plurality of guide rollers freely rotatable about a common axis on each of said shafts for rotation in respective planes obliquely inclined relative to said guide face, planes
      1. each roller having a radially outermost circular ridge of angular cross section constituting the circumference of the roller, and two faces coaxially flaring toward a common base,
      2. said outer circumference and the circumference of said common base being tangential to a common plane of sheet movement transverse to said face of the stationary guide member and to said plane of rotation and downwardly bounding said path;
   e. conveying means for sequentially moving said sheet in said direction in said common plane while said sheet is in rolling contact with said circumferences.

2. An apparatus as set forth in claim 1, wherein each of said two faces tapers from said common base to a narrow base axially contiguous to a narrow base of another roller, said ridge being approximately rectangular in cross section.

3. An apparatus as set forth in claim 2, wherein said planes of rotation are substantially parallel and approach said face at an angle smaller than 45° in said direction of sheet movement.

4. An apparatus as set forth in claim 2, wherein said conveying means include an endless, elongated conveying member, guide means guiding said conveying member in a closed loop, and actuating means for moving said conveying member in said loop, a strand of said loop extending closely adjacent said path, and a sheet engaging member extending from said conveying member into said path for engagement with a sheet therein, said sheet engaging member being interposed between two of said sets when engaging said sheet.

* * * * *